(12) United States Patent
Chen

(10) Patent No.: US 10,486,465 B2
(45) Date of Patent: Nov. 26, 2019

(54) REINFORCEMENT FOR A HUB RATCHET BASE

(71) Applicant: CHOSEN CO., LTD., Chang Hua Hsien (TW)

(72) Inventor: Ching-Shu Chen, Changhua (TW)

(73) Assignee: CHOSEN CO., LTD., Changhua (TW)

( * ) Notice: Subject to any disclaimer, the term of this patent is extended or adjusted under 35 U.S.C. 154(b) by 119 days.

(21) Appl. No.: 15/710,325

(22) Filed: Sep. 20, 2017

(65) Prior Publication Data

US 2019/0084349 A1 Mar. 21, 2019

(51) Int. Cl.
| | | |
|---|---|---|
| *F16D 41/30* | (2006.01) | |
| *B60B 27/02* | (2006.01) | |
| *B60B 27/04* | (2006.01) | |
| *B62M 9/00* | (2006.01) | |

(52) U.S. Cl.
CPC .......... *B60B 27/023* (2013.01); *B60B 27/047* (2013.01); *B62M 9/00* (2013.01); *F16D 41/30* (2013.01); *F16D 2200/0004* (2013.01); *F16D 2300/12* (2013.01)

(58) Field of Classification Search
CPC ...... B60B 27/023; B60B 27/047; F16D 41/30
See application file for complete search history.

(56) References Cited

U.S. PATENT DOCUMENTS

| | | | | |
|---|---|---|---|---|
| 7,121,394 B2* | 10/2006 | Chen | ...................... | F16D 41/30 192/64 |
| 7,617,920 B2* | 11/2009 | Kanehisa | ............ | B60B 27/0005 192/46 |
| 7,938,242 B2* | 5/2011 | Chen | ...................... | F16D 41/30 192/46 |
| 8,276,731 B2 | 10/2012 | Chen | | |
| 8,556,055 B2 | 10/2013 | Chen | | |
| 9,441,682 B1* | 9/2016 | Wu | ...................... | F16D 41/30 |
| 9,506,508 B2* | 11/2016 | Chen | ...................... | F16D 41/12 |

(Continued)

FOREIGN PATENT DOCUMENTS

| | | |
|---|---|---|
| TW | I352042 | 11/2011 |
| TW | I410337 | 10/2013 |

OTHER PUBLICATIONS

Machine Translation from ESPACENET of Abstract for TW I410337, Oct. 1, 2013.

(Continued)

*Primary Examiner* — David R Morris

(57) ABSTRACT

A reinforcement for a hub ratchet base comprising a chain-ring and a ratchet ring. The chain-ring is made of an aluminum material having a chain-ring socket and an assembly shaft. The ratchet ring is made of a metal material with high hardness which can be the titanium alloy material or the chrome-molybdenum steel material. The ratchet ring has an engaging slot corresponding to the assembly shaft of the chain-ring. There are at least three connecting slots disposed on the ratchet ring for accepting at least three ratchet members and at least three corresponding elastic members. Each of the connecting slots of the ratchet ring has a pivoting portion on an end for engaging with a ratchet member and an engaging portion on another end for engaging with an elastic member such that the elastic member pushes against a bottom portion of the ratchet member.

5 Claims, 15 Drawing Sheets

(56) References Cited

U.S. PATENT DOCUMENTS

| | | | | |
|---|---|---|---|---|
| 9,676,233 B1* | 6/2017 | Chen | ................... | B60B 27/047 |
| 2006/0081434 A1* | 4/2006 | Chen | ..................... | F16D 41/30 |
| | | | | 192/64 |
| 2008/0017471 A1* | 1/2008 | Kanehisa | ............ | B60B 27/0005 |
| | | | | 192/64 |
| 2010/0122886 A1* | 5/2010 | Chen | ..................... | F16D 41/30 |
| | | | | 192/64 |
| 2011/0061490 A1* | 3/2011 | Chen | ................... | B60B 27/023 |
| | | | | 74/576 |
| 2013/0056320 A1* | 3/2013 | Chen | ..................... | F16D 41/30 |
| | | | | 192/45.1 |
| 2016/0273594 A1* | 9/2016 | Chen | ..................... | F16D 41/12 |
| 2017/0096030 A1* | 4/2017 | Engel | ................. | B60B 27/0026 |
| 2017/0361650 A1* | 12/2017 | Shen | ................... | B60B 27/0021 |

OTHER PUBLICATIONS

IMachine Translation from ESPACENET of Abstract for TW I352042, Nov. 11, 2011.

\* cited by examiner

REINFORCEMENT FOR A HUB RATCHET BASE

BACKGROUND of INVENTION

1. Field of Invention

The present invention relates to a bicycle hub structure, and more particularly to a reinforcement for a hub ratchet base.

2. Description of Related Art

Currently, a conventional hub ratchet base 30, as shown in FIG. 13 and FIG. 14, a ratchet base 30 has a chainring 31 and a ratchet member 32. The chainring 31 is configured for being assembled with a bicycle gear disk. The ratchet member 32 is provided with a plurality of connecting slots 321, and the connecting slots 321 respectively engages with a ratchet member 33 and an elastic member 34. The ratchet member 33 is pivoted onto one end of the connecting slot 321, and the elastic member 34 is secured onto another end of the connecting slot 321 and pushing against the ratchet member 33.

However, the conventional hub ratchet base 30 is made of aluminum metal, with the impact caused by the ratchet member 33, the connecting slot 321, as shown in FIGS. 15 and 16 might be deformed, and the ratchet member 33 might also move due to the deformation of the connecting slot 321.

Therefore, it is desirable to provide a reinforcement for a hub ratchet base to mitigate and/or obviate the aforementioned problems.

SUMMARY of INVENTION

An objective of present invention is to provide a reinforcement for a hub ratchet base which is capable of improving the above-mention problems.

In order to achieve the above mentioned objective, A reinforcement for a hub ratchet base has a chain-ring made of an aluminum material having a chain-ring socket and an assembly shaft; and a ratchet ring made of a metal material with high hardness, having an engaging slot corresponding to the assembly shaft of the chain-ring, at least three connecting slots for accepting at least three ratchet members and at least three corresponding elastic members.

Each of the connecting slots of the ratchet ring has a pivoting portion on an end for engaging with a ratchet member and an engaging portion on another end for engaging with an elastic member such that the elastic member pushes against a bottom portion of the ratchet member.

Preferably, the ratchet ring is made of a titanium alloy material.

Preferably, the ratchet ring is made of a chrome-molybdenum steel material.

Each connecting slot of the ratchet ring is provided with a pivoting portion at one end, a limiting slot connecting to the pivoting portion is provided on the ratchet ring; the pivoting portion of the ratchet ring engages with a ratchet member and the ratchet member has a limiting groove, the limiting groove passing through an actuation end of the ratchet member; and a C-shaped elastic member is disposed on the limiting slot of the ratchet ring such that the ratchet member is restricted by the elastic member and the actuation end protrudes from the connecting slot.

The assembly shaft of the chain-ring is provided with at least three engaging portions, each engaging portion is provided with a locking aperture; the engaging slot of the ratchet ring is further provided with at least three engaging indentations corresponding to the engaging portions; and each engaging indentation is provided with a sidewall adjacent to the ratchet ring, pushing against the engaging portion and having a through aperture for engaging with the locking member and the engaging portion.

Each of the connecting slots of the ratchet ring has a pivoting portion on an end for engaging with a ratchet member and an engaging portion on another end for engaging with an elastic member such that the elastic member pushes against a bottom portion of the ratchet member.

Other objects, advantages, and novel features of invention will become more apparent from the following detailed description when taken in conjunction with the accompanying drawings.

DETAILED DESCRIPTION OF PREFERRED EMBODIMENT

Figure 1:
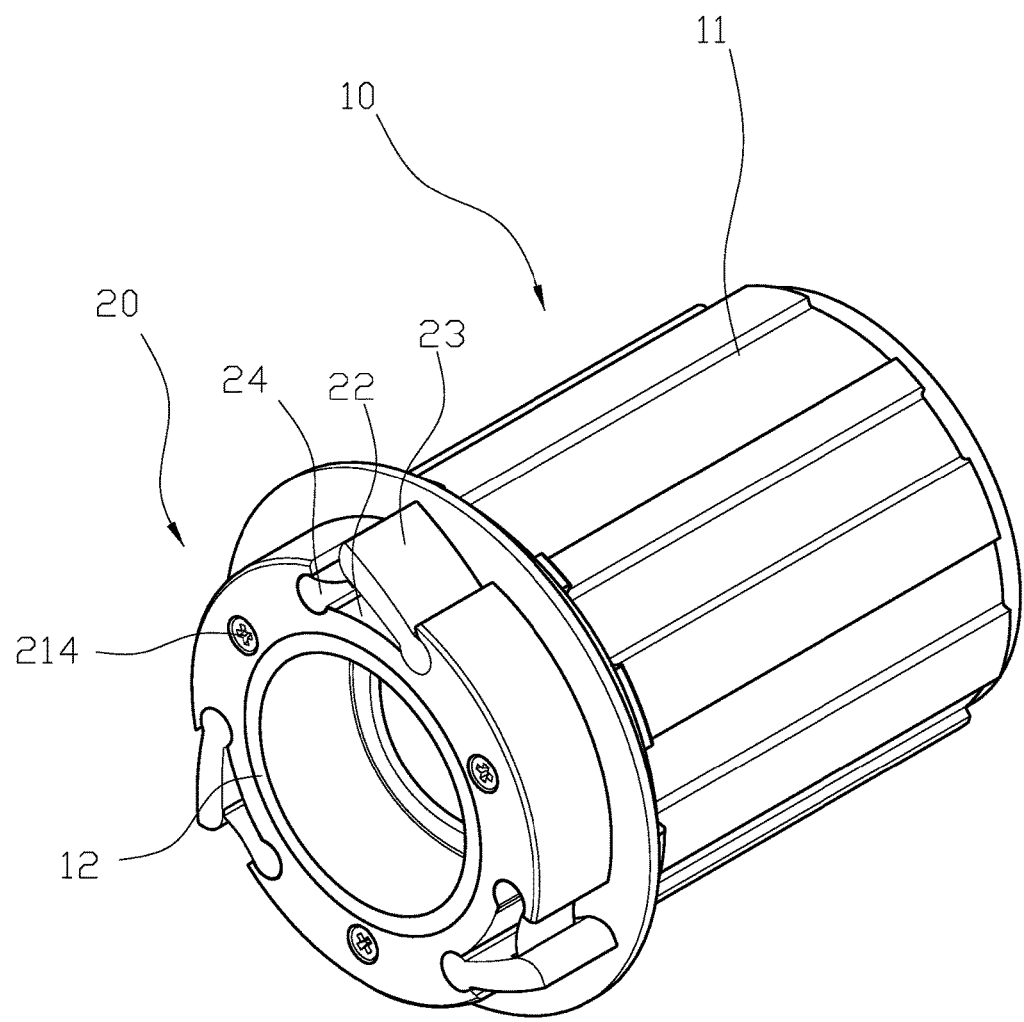
FIG. 1 is a perspective view of a preferred embodiment of the present invention.
Figure 2:
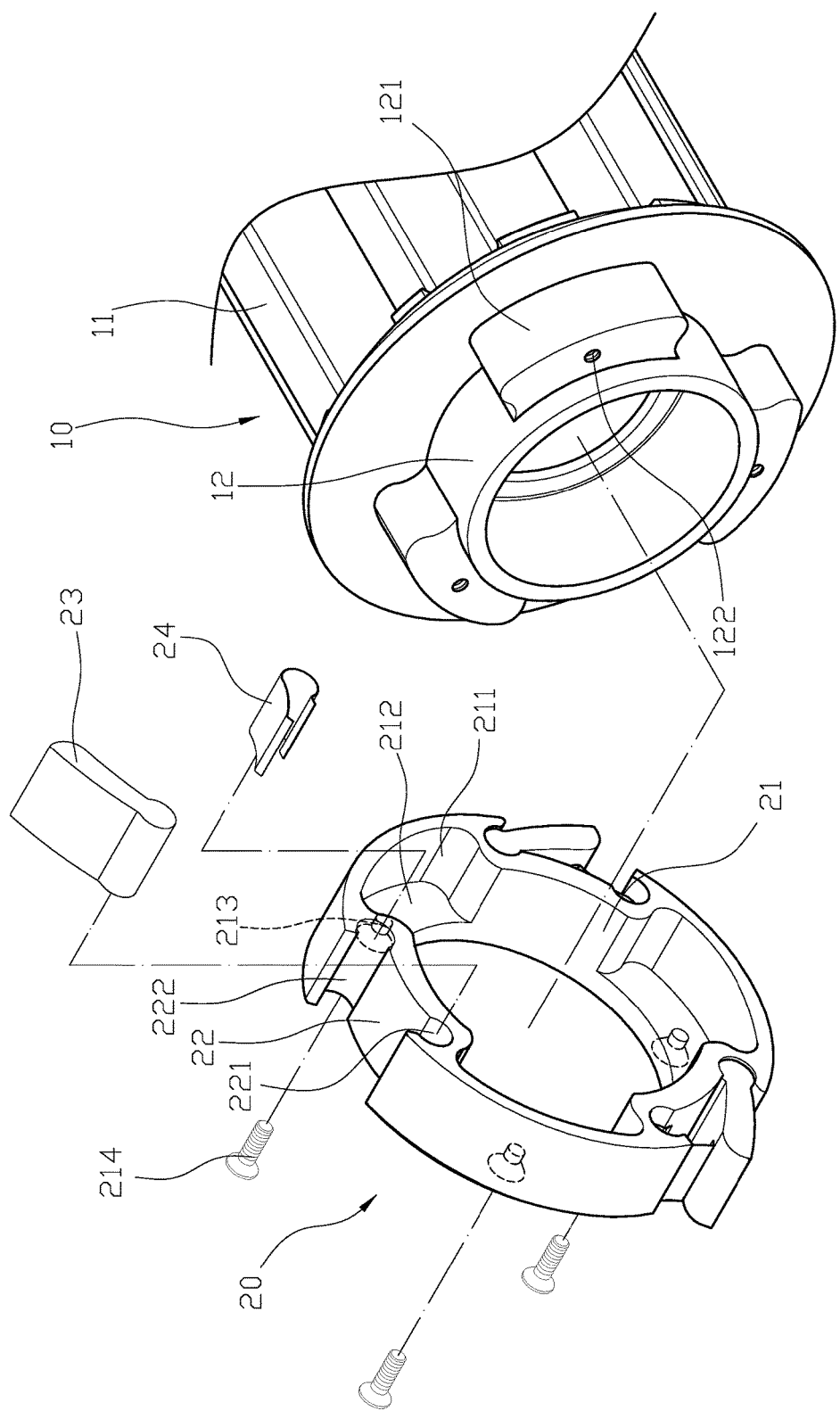
FIG. 2 is an exploded view of the preferred embodiment of the present invention.

Please refer to FIGS. 1 and 2. A reinforcement for a hub ratchet base comprising a chain-ring 10 and a ratchet ring 20. The chain-ring 10 is made of an aluminum material having a chain-ring socket 11 and an assembly shaft 12. The ratchet ring 20 is made of a metal material with high hardness which can be the titanium alloy material or the chrome-molybdenum steel material. The ratchet ring 20 has an engaging slot 21 corresponding to the assembly shaft 12 of the chain-ring 10. There are at least three connecting slots 22 disposed on the ratchet ring 20 for accepting at least three ratchet members 23 and at least three corresponding elastic members 24. each of the connecting slots 22 of the ratchet ring 20 has a pivoting portion 221 on an end for engaging with a ratchet member 23 and an engaging portion 222 on another end for engaging with an elastic member 24 such that the elastic member 24 pushes against a bottom portion of the ratchet member 23.

Figure 3:
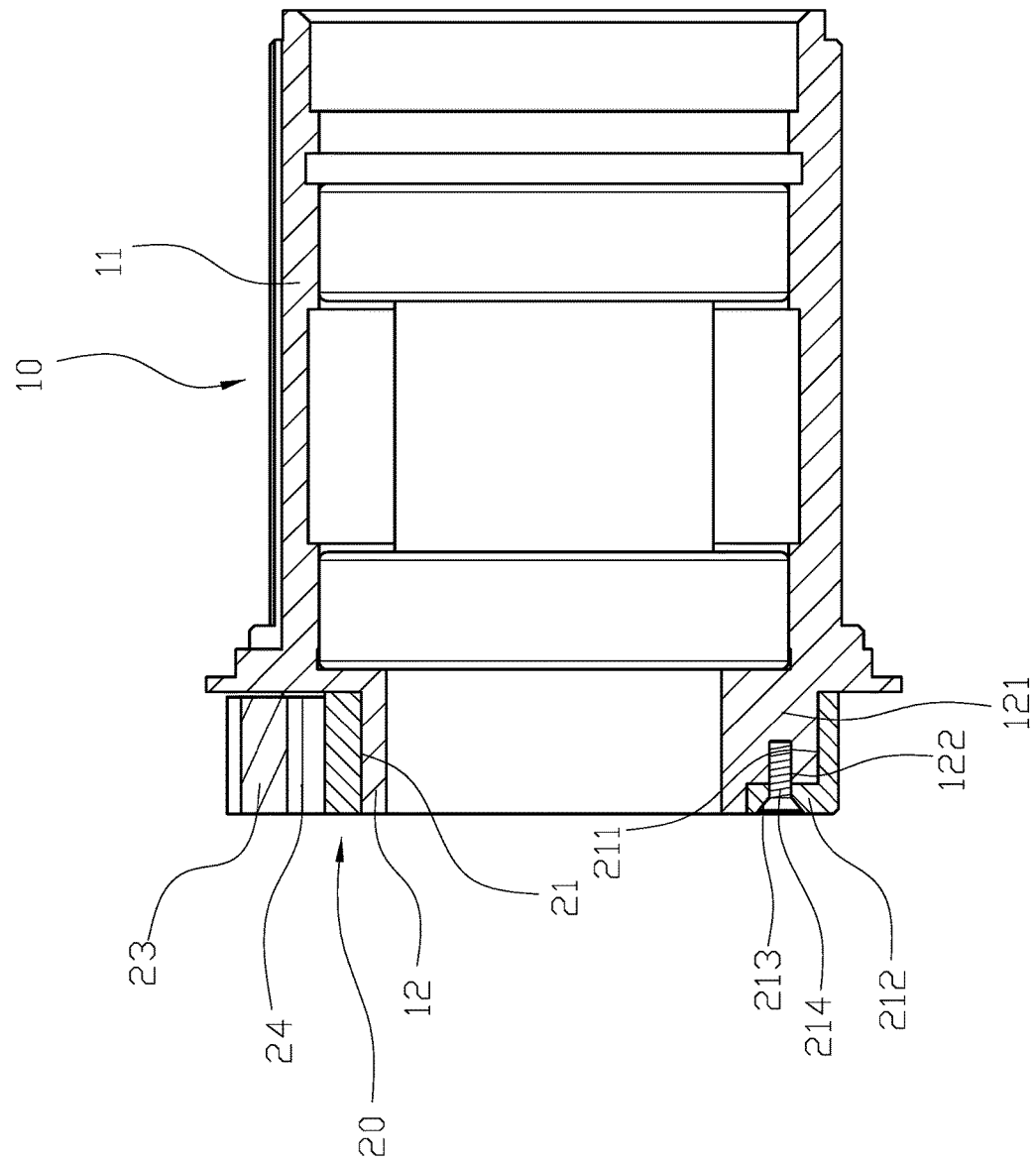
FIG. 3 is a cross-sectional view of the preferred embodiment of the present invention.
Figure 4:
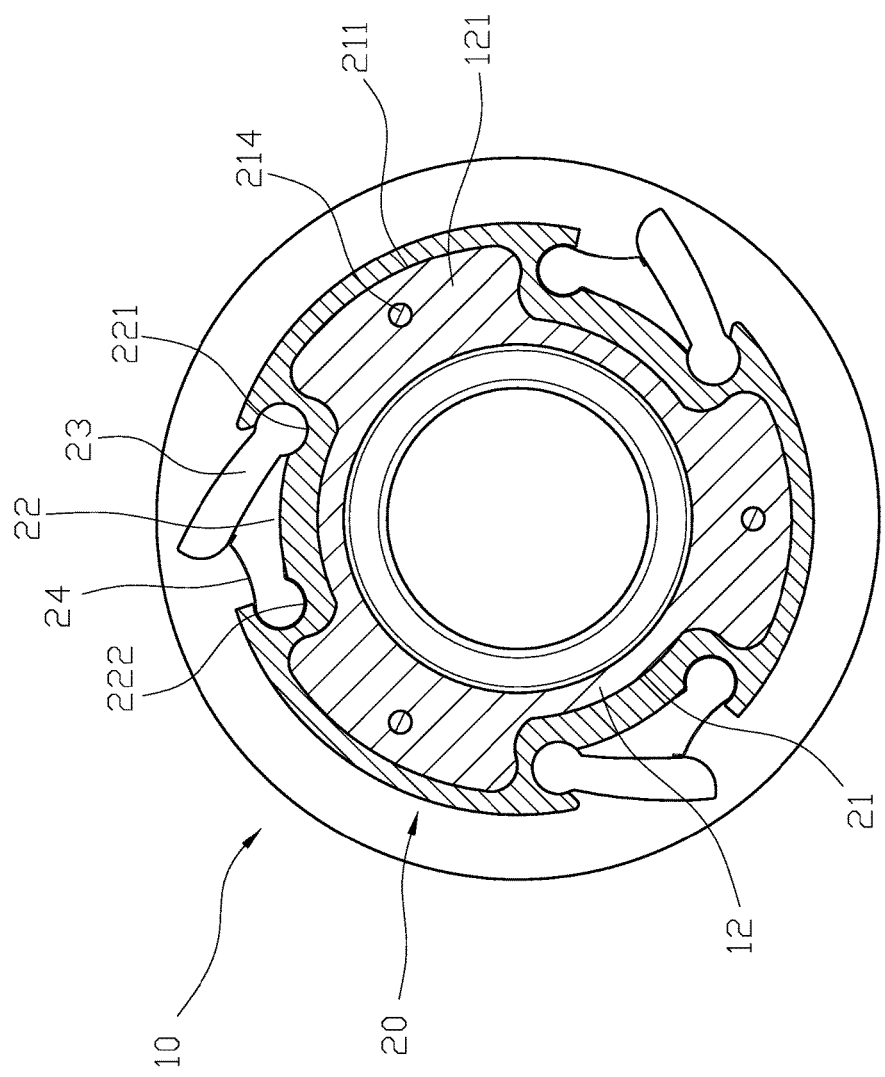
FIG. 4 is another cross-sectional view of the preferred embodiment of the present invention.
Figure 5:
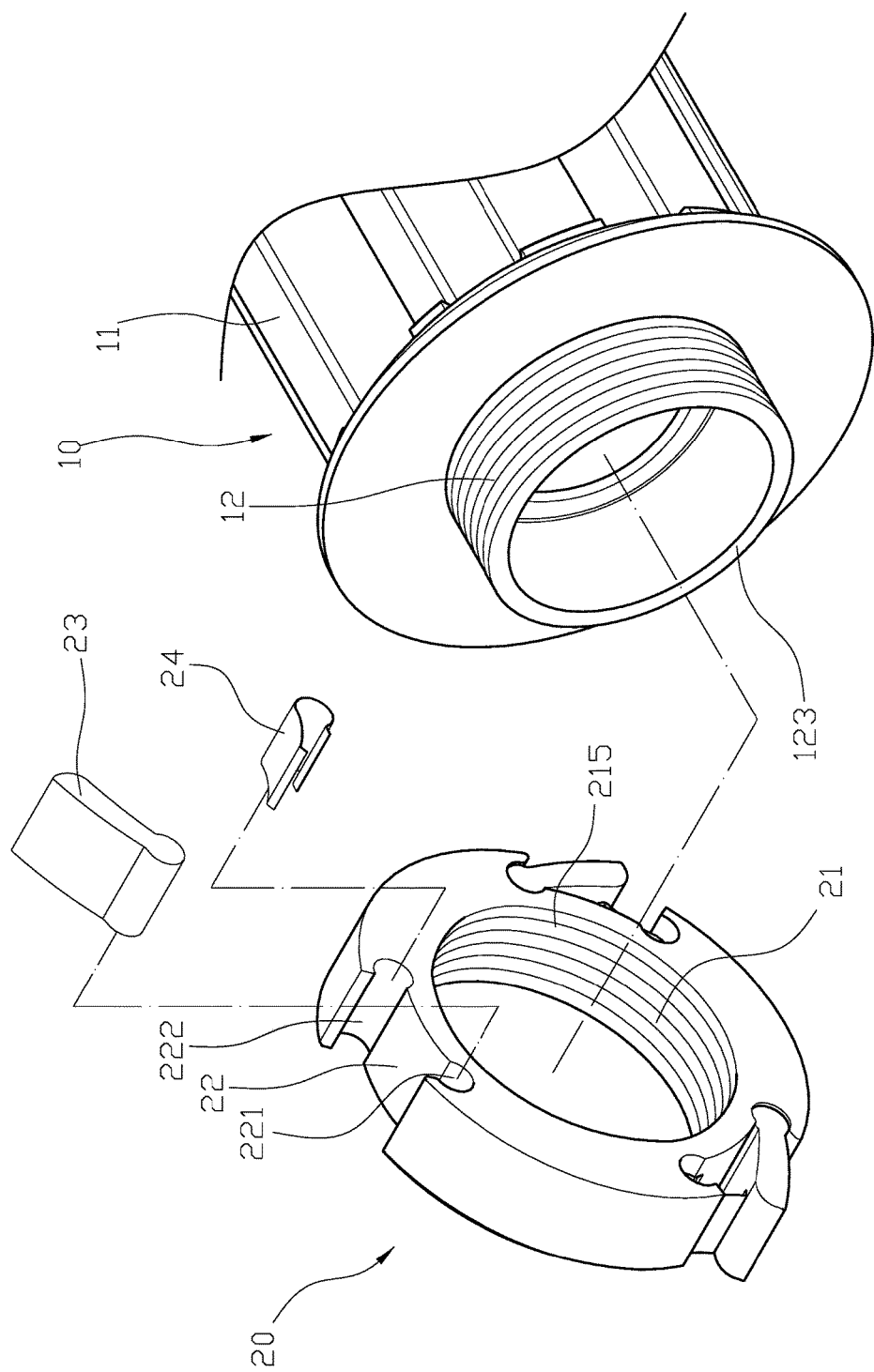
FIG. 5 is an exploded view of another embodiment of the present invention.
Figure 6:
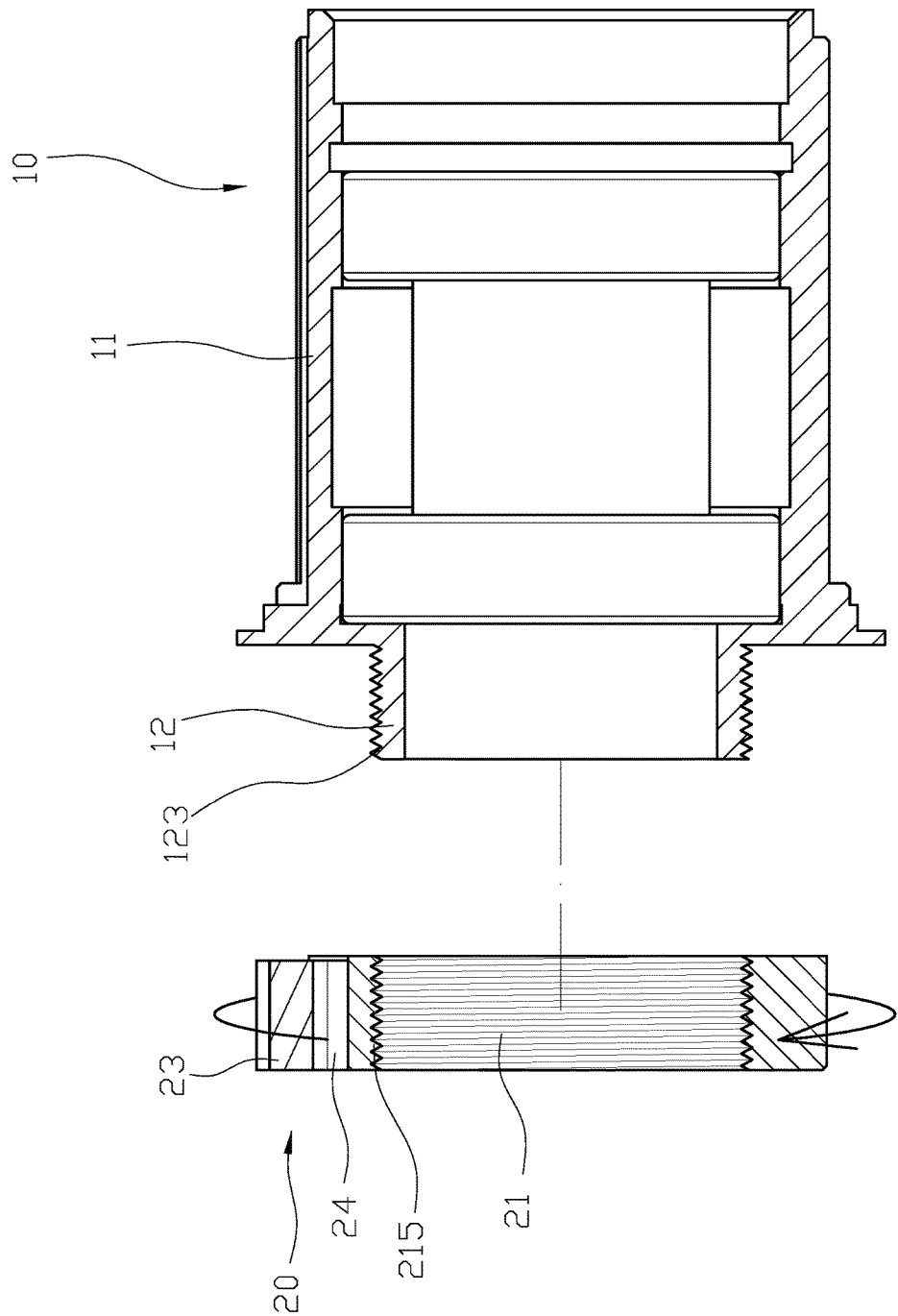
FIG. 6 is another cross-sectional view of another embodiment of the present invention.
Figure 7:
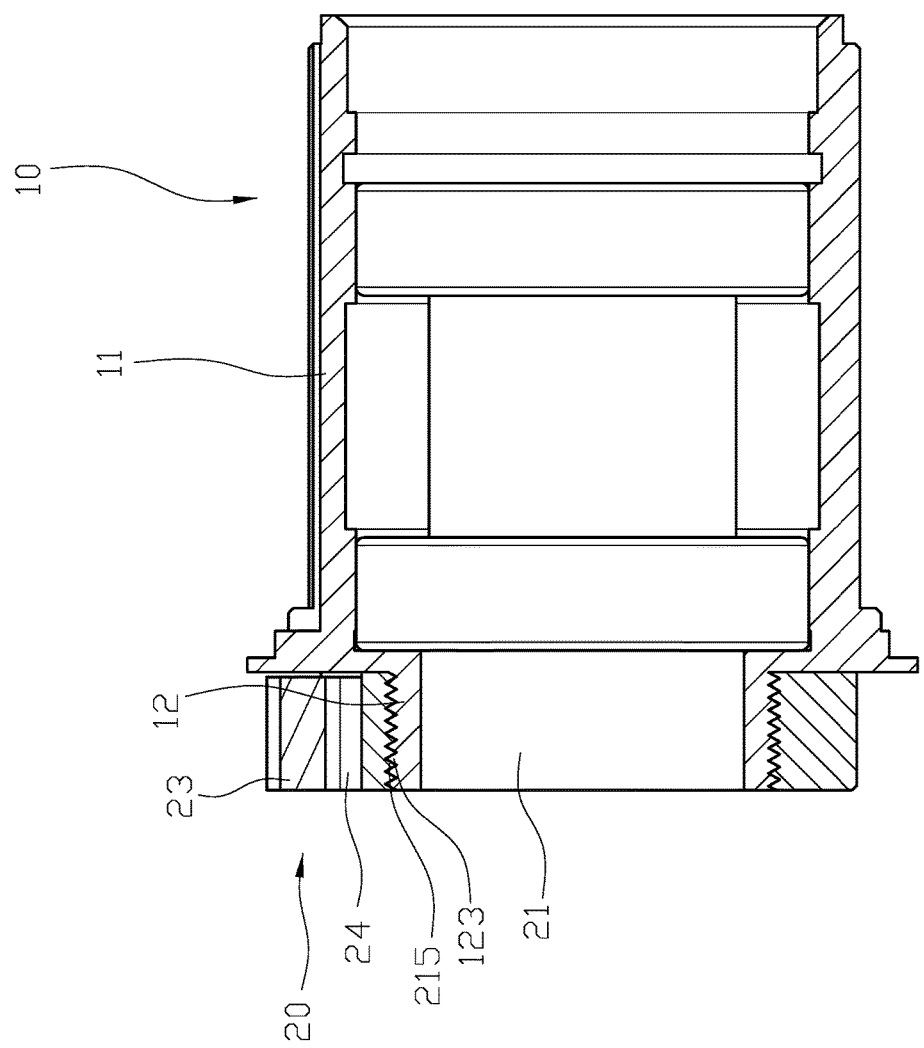
FIG. 7 is a cross-sectional view of another embodiment of the present invention.
Figure 8:
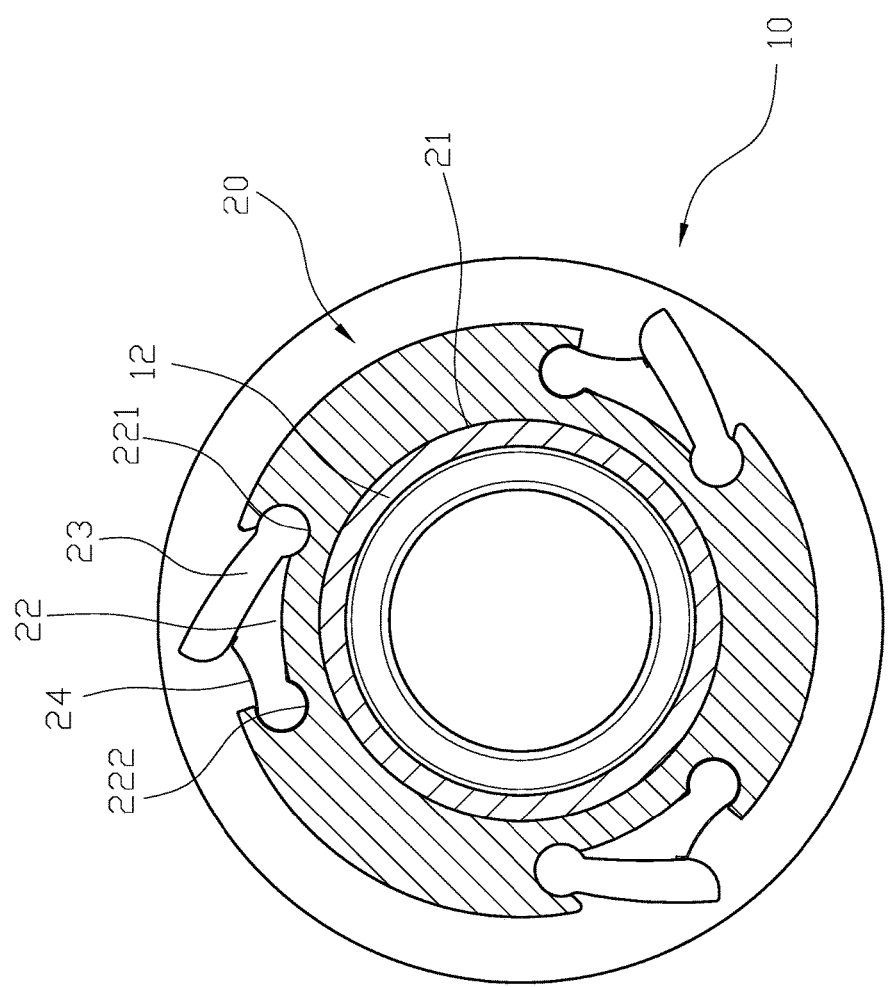
FIG. 8 is another cross-sectional view of another embodiment of the present invention.

Please refer to FIGS. 2, 3 and 4. The assembly shaft 12 of the chain-ring 10 is provided with at least three engaging portions 121, and each engaging portion 121 is provided with a locking aperture 122. The engaging slot 21 of the ratchet ring 20 is further provided with at least three engaging indentations 211 corresponding to the engaging portions 121. Each engaging indentation 211 is provided with a sidewall 212 adjacent to the ratchet ring 20, pushing against the engaging portion 121 and having a through aperture 213 for engaging with the locking member 214 and the engaging portion 121. When the engaging slot 21 is slipped onto the assembly shaft 12 and the engaging indentation 211 correspondingly engages with the engaging portion 121 such that the ratchet ring 20 is secured onto the assembly shaft 12 of the chain-ring 10. When the sidewall 212 is pushed against of end of the engaging portion 121, the locking member 214 passes through each through aperture 213 and each engaging portion 121 to be engaged and secured.

For another embodiment, please refer to FIGS. 5, 6 7 and 8. The assembly shaft 12 of the chain-ring 10 has an outer threaded section 123, and the engaging slot 21 of the ratchet ring 20 has a corresponding inner threaded section 215. The ratchet ring 20 utilizes the engaging slot 21 to engage with the assembly shaft 12 of the chain-ring 10. An engaging direction of the engaging slot 21 and the assembly shaft 12 is identical with an actuation direction of the ratchet member 33. Therefore, the ratchet ring 20 is engaged and driven by the ratchet member 23 and more secured with the assembly shaft 12 of the chain-ring 10 to combine the ratchet ring 20 and the chain-ring 10.

Figure 9:
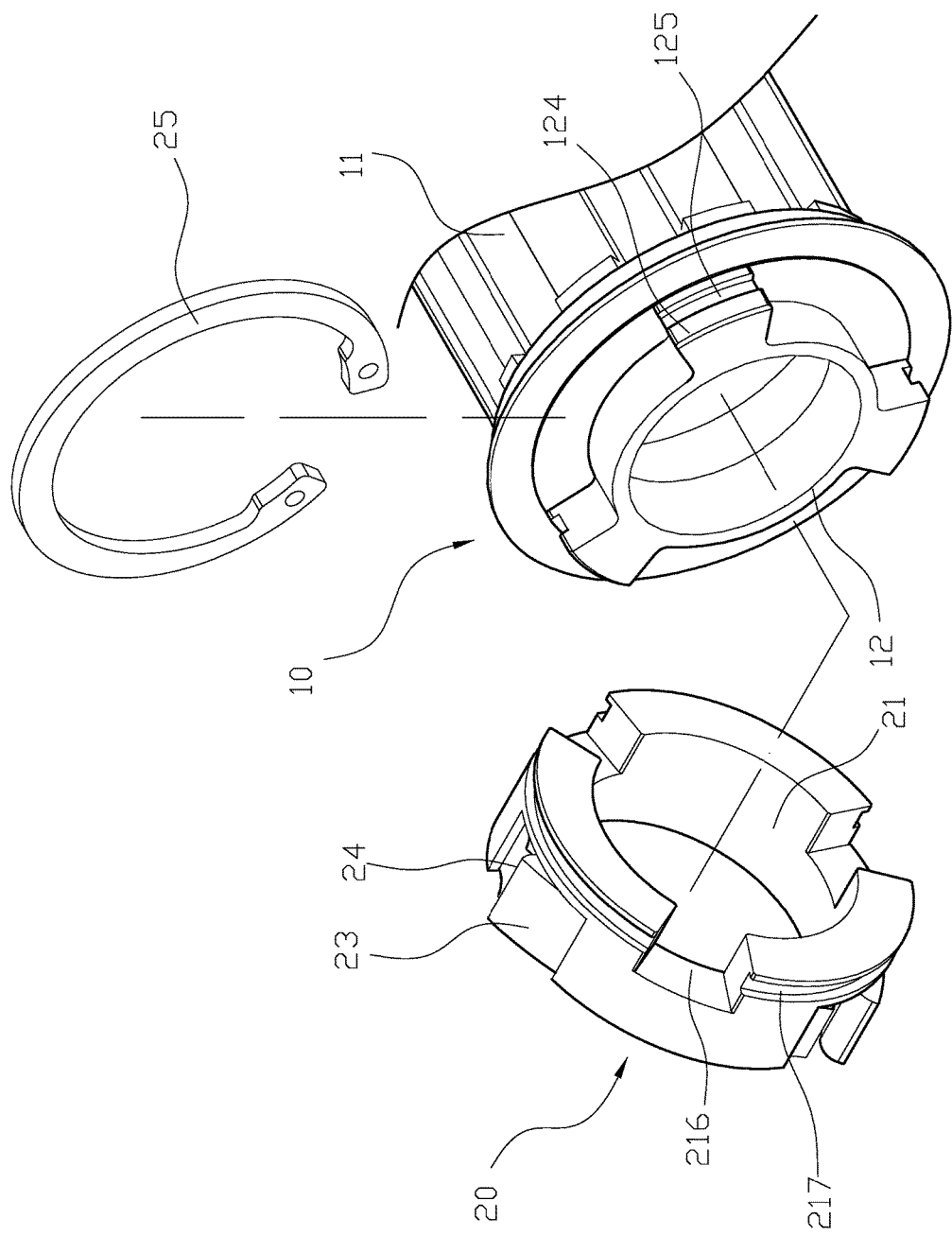
FIG. 9 is an exploded view of another embodiment of the present invention.
Figure 10:
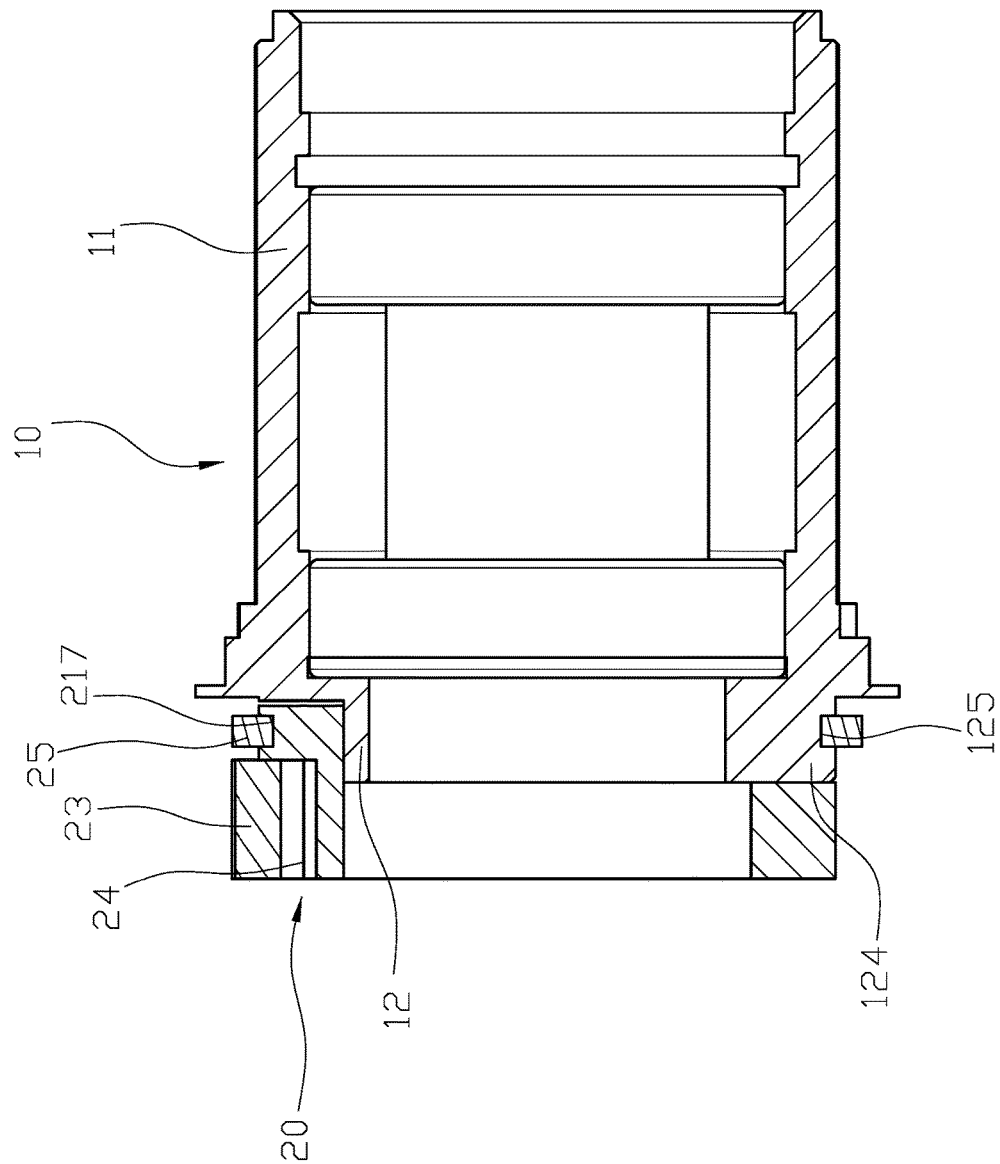
FIG. 10 is another cross-sectional view of another embodiment of the present invention.

For another embodiment, please refer to FIGS. 9 and 10, the assembly shaft 12 of the chain-ring 10 has at least three engaging protrusions 124, and each engaging protrusion 124 has an outer groove 125. The ratchet ring 20 has at least three engaging grooves 216 connecting to the engaging slot 21 and parting from the connecting slot 22. The ratchet ring 20 utilizes the engaging slot 21 to engage with the assembly shaft 12 of the chain-ring 10, and the engaging groove 216 engages with the engaging protrusion 124. The ratchet ring 20 further has a circular slot 217 connecting to the outer groove 125 of the engaging protrusion 124 and secured by a C-type fastening buckle 25.

Figure 11:
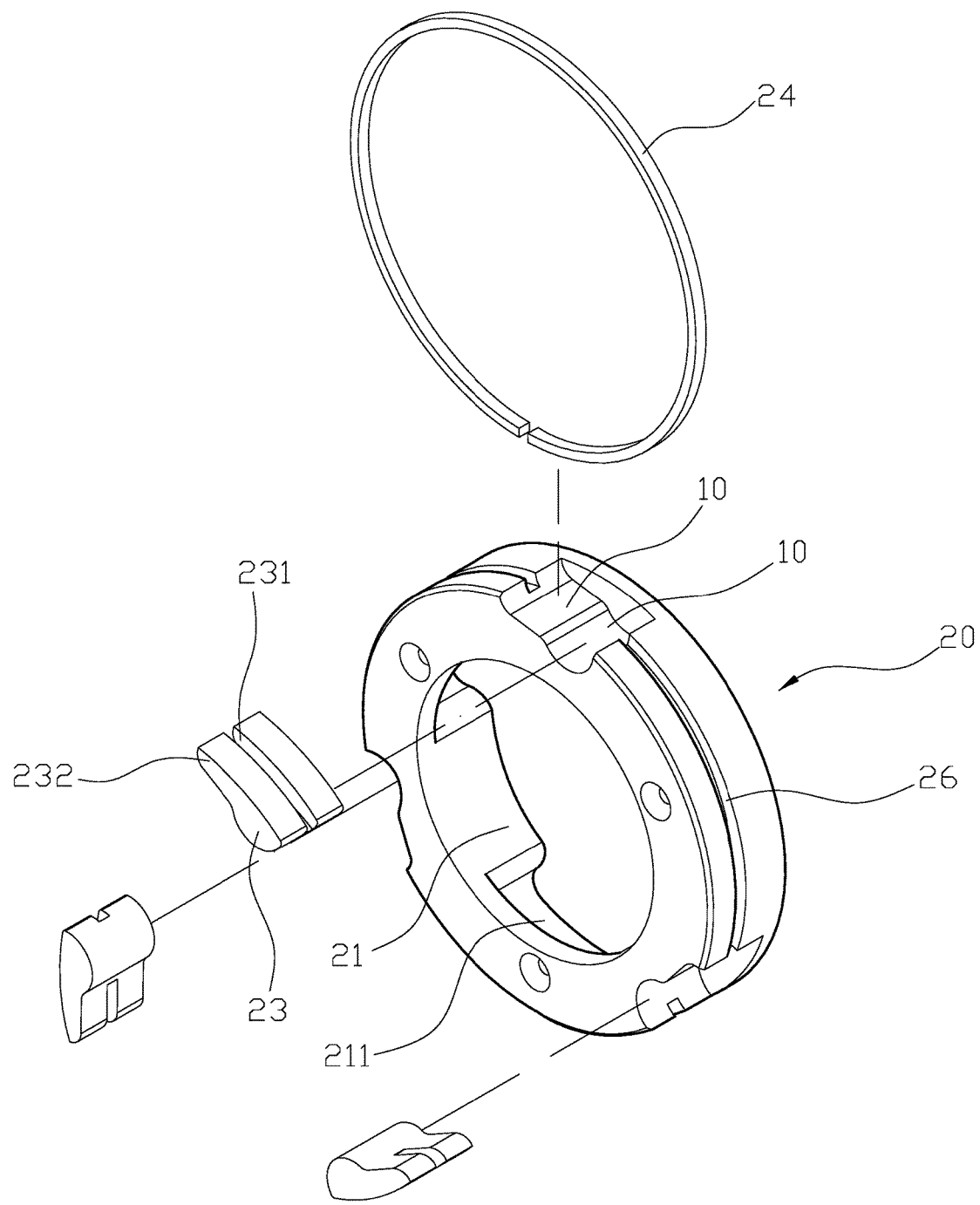
FIG. 11 is an exploded view of another embodiment of the ratchet ring of the present invention.
Figure 12:
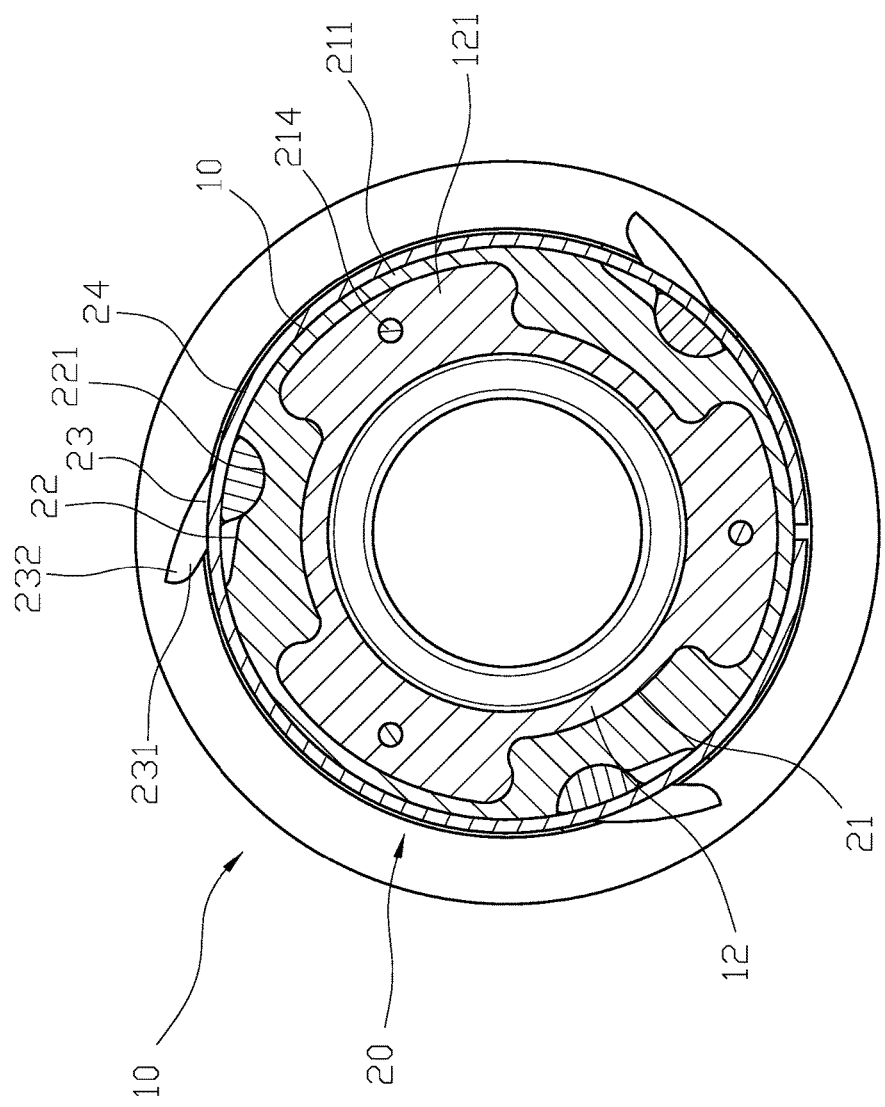
FIG. 12 is a cross-sectional view of another embodiment of the ratchet ring of the present invention.
Figure 13:
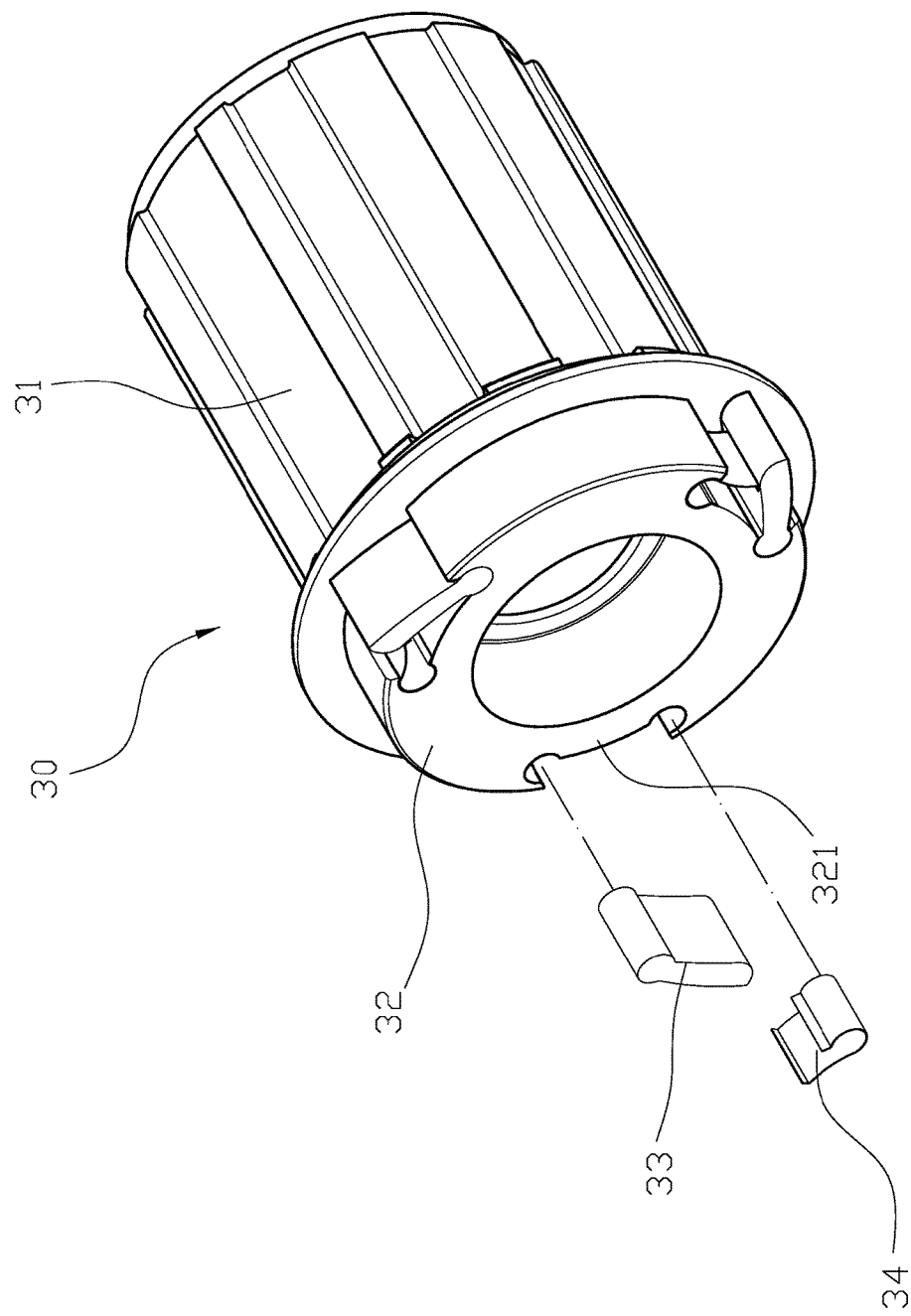
FIG. 13 is a perspective drawing of a conventional art.
Figure 14:
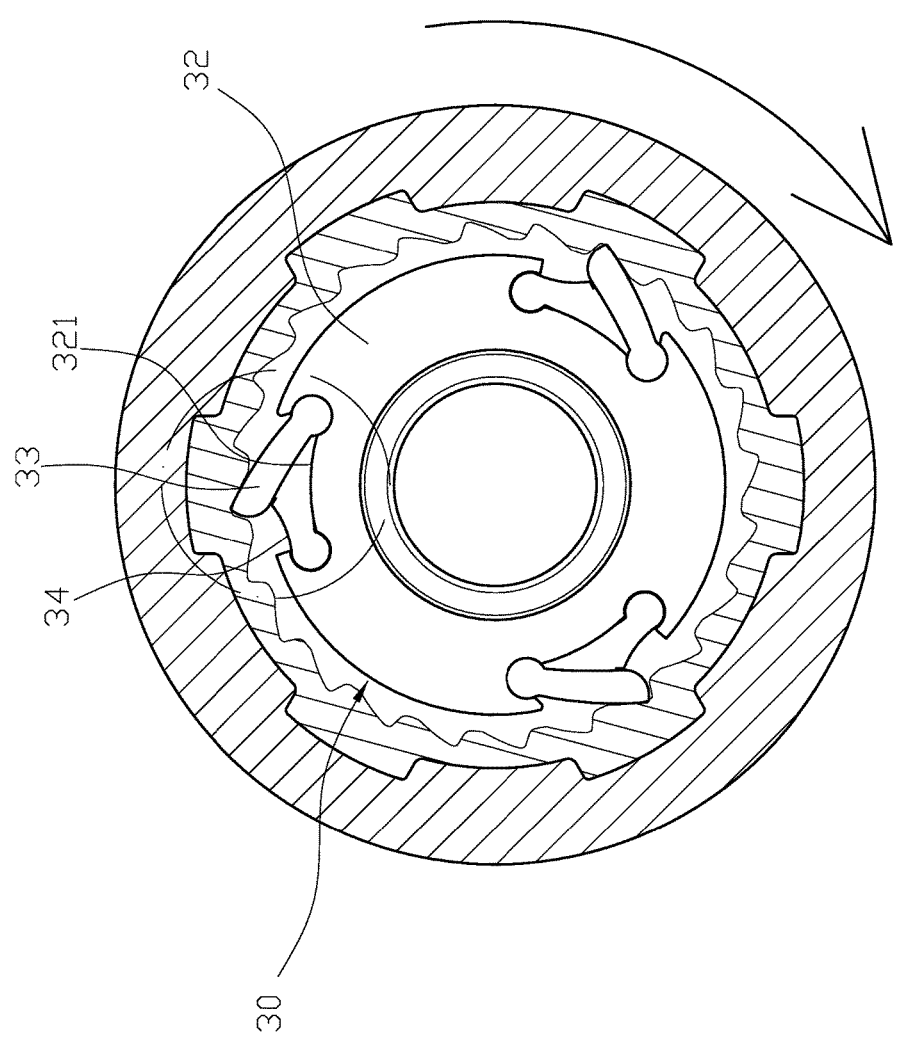
FIG. 14 is a cross-sectional view of the conventional art.
Figure 15:
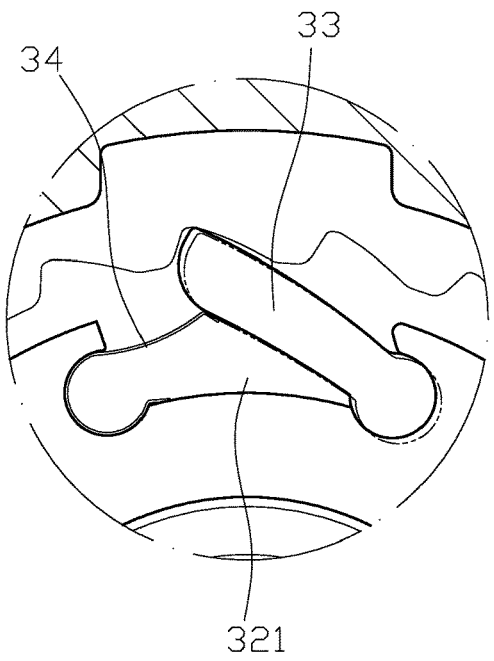
FIG. 15 is a local enlarged schematic drawing of the conventional art.
Figure 16:
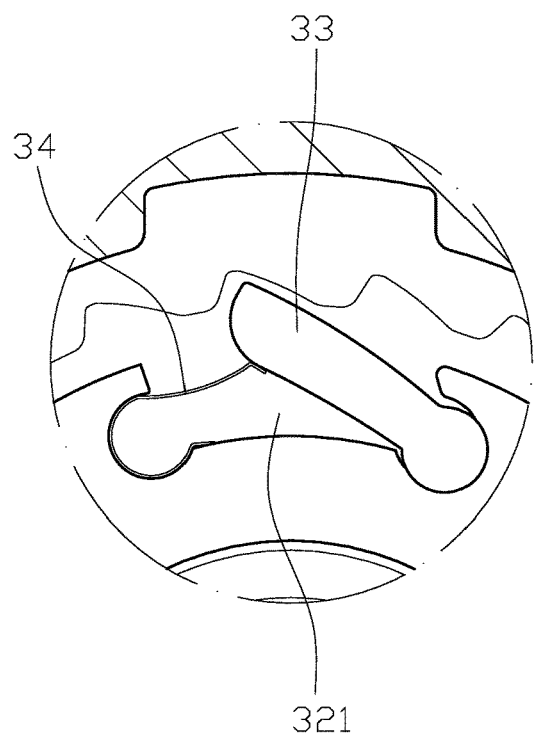
FIG. 16 is another local enlarged schematic drawing of the conventional art.

Furthermore, for another embodiment of the ratchet ring, please refer to FIGS. 11 and 12. Each of connecting slots 22 of the ratchet ring 20 is provided with a pivoting portion 221 at an end and a limiting slot 26 connecting to the pivoting portion 221 is provided on the ratchet ring 20. The pivoting portion 221 of the ratchet ring 221 engages with a ratchet member 23 and the ratchet member 23 has a limiting groove 231, and the limiting groove 231 passes through an actuation end 232 of the ratchet member 23. A C-shaped elastic member 24 is disposed on the limiting slot 26 of the ratchet ring 20 such that the ratchet member 23 is restricted by the elastic member 24 and the actuation end 232 protrudes from the connecting slot 22. Reversibly, when the actuation end 232 of the ratchet member 23 moves inwardly, another end of the ratchet member 23 pushes up the elastic member 24 to allow the ratchet member 23 to withdraw.

With the above-mentioned embodiment, following benefits can be obtained: the chain-ring 10 and the ratchet ring 20 are assembled together, the chain-ring 10 is made of aluminum material, and the ratchet ring 20 is made of other metal with higher hardness to increase the strength of the ratchet ring 20 and avoid from being deformed by the ratchet member 23 too elongate the life term of the ratchet ring 20. Furthermore, the ratchet ring 20 is replaceable for the user, which is more consumer-friendly.

Although the present invention has been explained in relation to its preferred embodiment, it is to be understood that many other possible modifications and variations can be made without departing from the spirit and scope of invention as hereinafter claimed.

What is claimed is:

1. A reinforcement for a hub ratchet base comprising:
   a chain-ring made of an aluminum material having a chain-ring socket and an assembly shaft; and
   a ratchet ring made from a titanium alloy or a chrome-molybdenum steel alloy, having an engaging slot corresponding to the assembly shaft of the chain-ring, at least three connecting slots for accepting at least three ratchet members and at least three corresponding elastic members;
   wherein the assembly shaft of the chain-ring has at least three engaging protrusions, each engaging protrusion has an outer groove, the ratchet ring has at least three engaging grooves connecting to the engaging slot to combine the ratchet ring and the chain-ring, and the ratchet ring further has a circular slot connecting to the outer groove of the engaging protrusion and secured by a C-type fastening buckle.

2. The reinforcement for a hub ratchet base as claimed in claim 1, wherein each of connecting slots of the ratchet ring has a pivoting portion on an end for engaging with a ratchet member and an engaging portion on another end for engaging with an elastic member such that the elastic member pushes against a bottom portion of the ratchet member.

3. The reinforcement for a hub ratchet base as claimed in claim 1, wherein the ratchet ring is made of a titanium alloy material.

4. The reinforcement for a hub ratchet base as claimed in claim 1, wherein the ratchet ring is made of a chrome-molybdenum steel material.

5. The reinforcement for a hub ratchet base as claimed in claim 1, wherein each connecting slot of the ratchet ring is provided with a pivoting portion at an end, a limiting slot connecting to the pivoting portion is provided on the ratchet ring; the pivoting portion of the ratchet ring engages with a ratchet member and the ratchet member has a limiting groove, the limiting groove passing through an actuation end of the ratchet member; and a C-shaped elastic member is disposed on the limiting slot of the ratchet ring such that the ratchet member is restricted by the elastic member and the actuation end protrudes from the connecting slot.

* * * * *